(12) United States Patent
Lower et al.

(10) Patent No.: US 12,491,561 B2
(45) Date of Patent: Dec. 9, 2025

(54) METHOD AND ELECTRON BEAM EQUIPMENT FOR PROCESSING POWDERED MATERIALS AT HIGH ACCELERATION VOLTAGES

(71) Applicant: PRO-BEAM GMBH & CO. KGAA, Gilching (DE)

(72) Inventors: Thorsten Lower, Munich (DE); Alexander Klassen, Munich (DE)

(73) Assignee: PRO-BEAM GMBH & CO. KGAA, Gilching (DE)

( * ) Notice: Subject to any disclaimer, the term of this patent is extended or adjusted under 35 U.S.C. 154(b) by 875 days.

(21) Appl. No.: 17/631,537

(22) PCT Filed: Jul. 29, 2020

(86) PCT No.: PCT/EP2020/071433
§ 371 (c)(1),
(2) Date: Jan. 31, 2022

(87) PCT Pub. No.: WO2021/018980
PCT Pub. Date: Feb. 4, 2021

(65) Prior Publication Data
US 2022/0314326 A1   Oct. 6, 2022

(30) Foreign Application Priority Data

Jul. 30, 2019  (DE) ...................... 10 2019 120 570.0

(51) Int. Cl.
*B22F 10/362*  (2021.01)
*B22F 10/28*  (2021.01)
(Continued)

(52) U.S. Cl.
CPC ............ *B22F 10/362* (2021.01); *B22F 10/28* (2021.01); *B22F 12/41* (2021.01);
(Continued)

(58) Field of Classification Search
CPC ........ B22F 10/362; B22F 12/41; B22F 10/28; B33Y 10/00; B33Y 30/00; B33Y 40/10; B23K 15/0086; B23K 2103/08
(Continued)

(56) References Cited

U.S. PATENT DOCUMENTS 3,020,387 A * 2/1962 Basche ................... H01J 37/30
219/121.21
9,505,057 B2   11/2016 Nordkvist et al.
(Continued)

FOREIGN PATENT DOCUMENTS

CN   104 903 029 A   9/2015
CN   106 825 567     6/2017
(Continued)

OTHER PUBLICATIONS

Klassen et al., "Modelling of electron beam absorption in complex geometries," Journal of Physics D: Applied Physics, published Jan. 15, 2014, 12 pages.
(Continued)

*Primary Examiner* — Elizabeth M Kerr
*Assistant Examiner* — Simpson A Chen
(74) *Attorney, Agent, or Firm* — Schroeder Intellectual Property Law Group, LLC

(57) ABSTRACT

Methods are provided for processing a powdery material with an electron beam system for additive manufacturing of components, which solve the problem of electrostatic powder expulsion and significantly reduce process times. This effect is achieved by using acceleration voltages of 90 kV or greater in the preheating step and/or in the melting step.

12 Claims, 1 Drawing Sheet

(51) Int. Cl.
*B22F 12/41* (2021.01)
*B23K 15/00* (2006.01)
*B23K 103/08* (2006.01)
*B33Y 10/00* (2015.01)
*B33Y 30/00* (2015.01)
*B33Y 40/10* (2020.01)

(52) U.S. Cl.
CPC .......... *B23K 15/0086* (2013.01); *B33Y 10/00* (2014.12); *B33Y 30/00* (2014.12); *B33Y 40/10* (2020.01); *B23K 2103/08* (2018.08)

(58) Field of Classification Search
USPC .................................................... 219/121.14
See application file for complete search history.

(56) References Cited

U.S. PATENT DOCUMENTS

| | | | |
|---|---|---|---|
| 11,485,043 | B2 | 11/2022 | Lin et al. |
| 2010/0173167 | A1* | 7/2010 | Vissing .................... B05D 5/08 427/508 |
| 2015/0071809 | A1 | 3/2015 | Nordkvist et al. |
| 2017/0136542 | A1* | 5/2017 | Nordkvist ............. B29C 64/153 |
| 2017/0282285 | A1 | 10/2017 | Moratalla Martinez et al. |
| 2018/0147655 | A1 | 5/2018 | Ackelid |
| 2019/0099808 | A1 | 4/2019 | Hellestam |
| 2019/0099809 | A1* | 4/2019 | Hellestam ............. B29C 64/241 |
| 2019/0147578 | A1 | 5/2019 | Hellestam et al. |
| 2020/0238566 | A1* | 7/2020 | Lin ......................... B22F 10/28 |
| 2020/0282459 | A1 | 9/2020 | Nordkvist et al. |
| 2021/0053114 | A1* | 2/2021 | Watanabe ............... B22F 3/105 |

FOREIGN PATENT DOCUMENTS

| | | |
|---|---|---|
| EP | 3 403 746 A1 | 11/2018 |
| JP | 2018-536091 | 12/2018 |
| WO | 2015/032590 A2 | 3/2015 |
| WO | 2016/079360 A1 | 5/2016 |
| WO | 2017/084913 A1 | 5/2017 |
| WO | 2018/162261 A1 | 9/2018 |

OTHER PUBLICATIONS

C. Korner: "Additive manufacturing of metallic components by selective electron beam melting—a review," International Materials Reviews, Bd. 61, Nr, 5, Jul. 3, 2016, pp. 361-377.

* cited by examiner

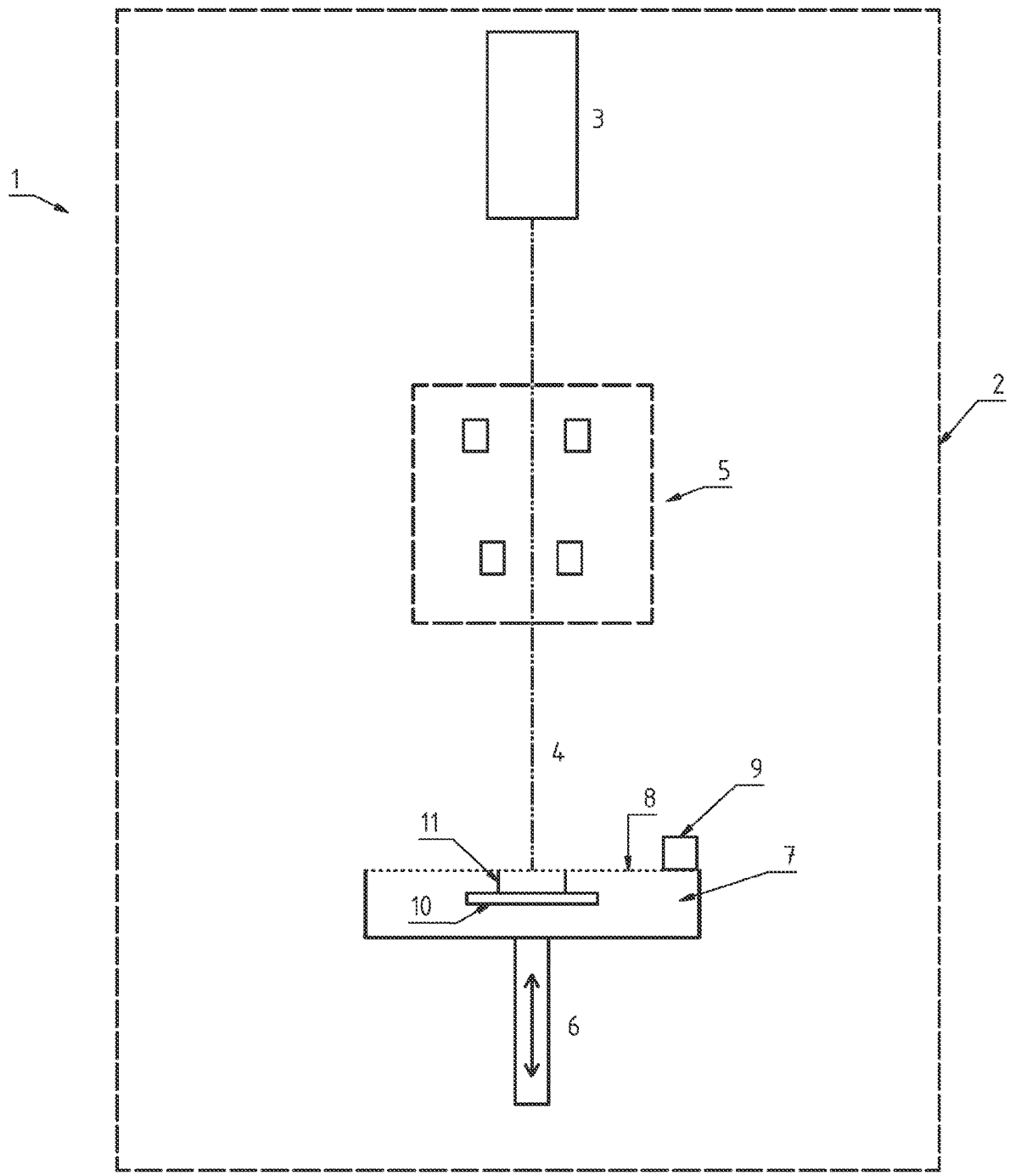

METHOD AND ELECTRON BEAM EQUIPMENT FOR PROCESSING POWDERED MATERIALS AT HIGH ACCELERATION VOLTAGES

RELATED APPLICATIONS

This application is a § 371 national phase of International Patent Application No. PCT/EP2020/071433 filed Jul. 29, 2020, which claims the filing benefit of German Patent Application No. 10 2019 120 570.0 filed Jul. 30, 2019, the contents of both of which are incorporated herein by reference.

BACKGROUND OF THE INVENTION

1. Field of Invention

The invention relates to a method for processing a powdery material with an electron beam system at high acceleration voltages. In particular, the invention relates to a method for preheating a powdery material at high acceleration voltages and a method for melting a powdery material at high acceleration voltages.

The invention further relates to an electron beam system for carrying out such methods for processing powdery material at high acceleration voltages.

2. Description of the State of the Art

Additive manufacturing processes are characterized by the joining of volume elements to form a three-dimensional structure, in particular by a layer-by-layer construction. Among other things, methods are used in which an energy beam is used to join a powdery material in a powder bed by selective fusion of the individual powder particles point by point and layer by layer to form a 3D structure. The material can be solidified by sintering of the powder particles or complete melting of the powder particles by means of laser beams or electron beams.

The processing of metal powder by selective electron beam melting (SEBM) allows the production of complex geometries and structures with fast and precise manipulability and a high degree of automation.

However, the processing of the powdery material with electron beams causes a locally and temporally limited electrostatic charge of the exposed powder bed, since metal powder particles, for example, are often surrounded by an oxide layer, which is less conductive. Therefore, even a metal powder particle, although conductive in its interior, can become electrically charged when the electron beam impinges.

The charging can reach a supercritical level and collectively accelerate the powder particles resting in the impact area of the electron beam out of the processing zone, i.e. distribute them from the powder bed to other areas of the electron beam system, before the fusion process occurs. This leads to material losses and process interruptions, since the material is expelled from the powder bed even before sintering.

In order to avoid malfunctions and material loss due to powder expulsion, it is known according to the current state of the art, after a layer of the powdery material has been applied, to preheat it in order to bond the individual powder particles together with less adhesion compared to the end product.

Only in a second step are the powder particles melted along the respective contour layer of a 3D structure to be generated with the electron beam to such an extent that sufficient stability of the 3D structure between the individual powder particles is produced for the subsequent intended use of the workpiece.

Known methods of these processes, summarized as preheating, include heating the applied powder layer by means of a hot plate or by exposure to electron beams with usual acceleration voltages of about 60 kV.

Another efficient method for preheating the powder layer is described in WO 2018/162261 A1, in which the problem of electrostatic powder expulsion is solved by applying an alternating electromagnetic field.

The disadvantages of these known methods can be seen in the necessary process time for heating the powder bed, in particular because the heating must be carried out for each individual powder layer over and over again applied, and the partially insufficient prevention of electrostatic powder expulsion.

SUMMARY OF THE INVENTION

It is therefore the task of the invention to provide methods for processing a powdery material which better solve the problem of electrostatic powder discharge of the powdery material during processing with the electron beam. It is further the object of the invention to disclose a corresponding electron beam system for processing the powdery material.

According to the invention, this task is solved by a method for processing a powdery material, which comprises the following steps:

a1) Providing an electron beam system comprising
    a device for receiving a powder bed of the powdery material to be processed, and
    an electron beam generator adapted to direct an electron beam to laterally different locations of the powder bed b1) Applying a powder layer to a substrate c1) Preheating of the powdery material with the electron beam wherein
    the electron beam in step c1) is operated with an acceleration voltage of 90 kV or greater.

Known electron beam machining processes and also preheating processes carried out by means of the electron beam are usually carried out at acceleration voltages of about 60 kV, because above this high voltage value hard X-rays occur which are not shielded by usual electron beam equipment. The inventors have now realized that by increasing the acceleration voltage to 90 kV or greater, a lower beam current can be selected for preheating by the electron beam while maintaining the same power input. As a result, a smaller number of charge carriers are introduced into the material per unit time, resulting in less electrostatic charging. Consequently, the temperature for premelting the powder particles can be achieved with a lower electrostatic charging. Furthermore, the higher acceleration voltage causes an increased penetration depth and thus a distribution of the electrons over a larger volume in the material.

The process according to the invention thus solves the described problem of electrostatic powder expulsion in that the preheating step causes a change in the energy balance in the powdery material, e.g. due to sintering. On the other hand, with the beam current remaining the same as in previous preheating methods, significantly shorter exposure times can be achieved by increasing the acceleration voltage, and consequently the process time can be shortened without increasing the electrostatic powder expulsion. In addition, the inventors have realized that higher acceleration voltages at constant beam current lead to a significant improvement in process stability due to reduced electrostatic powder expulsion.

Since the quantities determining the electrostatic powder bed charging can be derived from the local current density and the nature of the powder, the values for the acceleration voltage and the beam current can be derived using a formula. This formula can include such parameters as the temperature of the powder bed, the pressure in the electron beam unit, or a material property parameter such as melting temperature, heat capacity or conductivity of the powdery material.

Preferably, the method comprises the step d1) melting of at least part of the powder layer with the electron beam.

Preferably, the acceleration voltage in the process according to the invention is 90 kV to 150 kV, in particular 100 kV or greater, preferably 120 kV or greater.

Preferably, the beam power is at least 100 W and at most 100 kW.

Preferably, the powdery material comprises titanium, copper, nickel, aluminum and/or alloys thereof, in particular Ti-6Al-4V, an alloy comprising titanium, 6 wt % aluminum and 4 wt % vanadium.

Preferably, the powdery material has an average grain size D50 of 10 μm to 150 μm.

According to the invention, the task is solved by a further method for processing a powdery material, which comprises the following steps:
  a2) Providing an electron beam system (1) comprising
    a device (6) for receiving a powder bed (7) of the powdery material (12) to be processed, and
    an electron beam generator (3) adapted to direct an electron beam (4) to laterally different locations of the powder bed (7);
  b2) Applying a powder layer (9) to a substrate (10);
  c2) Melting at least part of the powdery material (12) with the electron beam (4);
  wherein the electron beam (4) in step c2) is operated at an acceleration voltage of 90 kV or greater; and
  no preheating of the powder layer (9) takes place between step b1) and step c1).

In addition to the improvements described above, this process can further reduce process time by completely omitting the preheating step and operating the electron beam at 90 kV or higher in the melting step. As with the previously described process with preheating step, this process takes advantage of the effect of increased penetration depth and the resulting better charge distribution of the electrons, as well as the reduced electron input at the same power.

Preferably, the acceleration voltage in the method according to the invention is 90 kV to 150 kV, in particular 100 kV or greater, preferably 120 kV or greater.

Preferably, the jet power is at least 100 W and at most 100 kW.

Preferably, the powdery material comprises titanium, copper, nickel, aluminum and/or alloys thereof, in particular Ti-6Al-4V, an alloy comprising titanium, 6 wt % aluminum and 4 wt % vanadium.

Preferably, the powdery material has an average grain size D50 of 10 μm to 150 μm.

With regard to the electron beam system for processing powdery material with an electron beam system, the system according to the invention comprises a device for receiving a powder bed of the powdery material to be processed, and
an electron beam generator adapted to direct an electron beam to laterally different locations on the powder bed,
wherein the electron beam system is adapted to carry out the methods according to the invention.

Preferably, the electron beam system has an X-ray shield for this purpose, which is configured in such a way that, despite a high voltage of over 90 kV, preferably over 100 kV, in particular over 120 kV, the X-ray radiation outside the electron beam system is below a specified limit. This limit must in particular satisfy the requirements of the Radiation Protection Ordinance.

The inventors have thus recognized that in order to increase the acceleration voltage into the voltage ranges relevant to the invention, additional X-ray shielding measures must be taken. For example, a viewing window into the interior of the electron beam system must be provided with a thicker shielding layer or even a separate cover must be provided which covers the viewing window during operation and whose opening terminates the process.

Advantageously, the electron beam system can include a control unit which, when the powder material to be fused is entered, determines the values for the acceleration voltage U and the beam current I using a stored formula.

BRIEF DESCRIPTION OF THE DRAWINGS

In the following, an embodiment of the invention is explained in more detail with reference to the drawing. In this shows:

FIG. 1 perspective view of an electron beam system according to the invention with a powder container.

DESCRIPTION OF PREFERRED EMBODIMENTS

FIG. 1 shows an electron beam system 1 with a vacuum housing 2 in which an electron beam gun 3 for generating an electron beam 4 is arranged. The vacuum housing 2 comprises a viewing window 14, which is provided with a thicker shielding layer 16 as an example of an X-ray shielding.

In the present embodiment, the electron beam gun 3 with an optional magnetoptical unit 5 is arranged above a lifting table 6 with a lifting plate and with a receiving frame, which serves as a spatially limited powder container, which receives a powder bed 7 of a powdery material to be processed.

A powder application device 9 with a squeegee (not shown), which can be moved over the lifting table, is arranged above the receiving frame. The powder application device 9 has a container, not shown, for the powdery material, from which the material can be evenly squeegeed onto the powder bed 7 as the uppermost loose layer 8 by a shifting movement.

The relative movement of the electron beam to the powder bed 7 can be achieved by deflecting the electron beam in the deflection device 5, or by setting the lifting table.

The powder bed contains a base plate 10 on which the component 11 is formed layer by layer.

Components manufactured using the methods according to the invention and the system according to the invention are used, among other things, in the aerospace industry as turbine blades, pump wheels and transmission mounts in helicopters; in the automotive industry as turbocharger wheels and wheel spokes; in medical technology as orthopedic implants and prostheses; as heat exchangers; and in tool and mold making.

The powdery material according to the invention includes all electrically conductive materials suitable for the electron beam process. Preferred examples are metallic or ceramic materials, in particular titanium, copper, nickel, aluminum and alloys thereof such as Ti-6Al-4V, an alloy consisting of titanium, 6 wt % aluminum and 4 wt % vanadium, AlSi10Mg and titanium aluminides (TiAl).

Other exemplary materials according to the invention are nickel-based alloys such as NiCr19NbMo, iron and iron alloys, in particular steels such as tool steel and stainless steel, copper and alloys thereof, refractory metals, in particular niobium, molybdenum, tungsten and alloys thereof, precious metals, in particular gold, magnesium and alloys thereof, cobalt-based alloys such as. CoCrMo, high entropy alloys such as AlCoCrFeNi and CoCrFeNiTi, and shape memory alloys.

Preferably, the powdery material has an average grain size D50 of 10 µm to 150 µm.

According to the invention, the acceleration voltage in the preheating step and/or in the melting step is 90 kV or more. The observed effects are based on the formula for calculating the electrical power $P=U_{acc} \cdot I$, where $U_{acc}$ stands for the acceleration voltage and I for the beam current.

Consequently, at a constant beam current, a higher acceleration voltage results in a higher energy input and thus a reduction of the process time, since a given temperature can be reached more quickly. Alternatively, higher build temperatures can be realized with the same exposure time.

With constant energy input, i.e. the beam current is reduced proportional to the increased acceleration voltage, a substantial increase in process stability can be observed. According to $P=U_{acc} \cdot I$, the number of charge carriers decreases approximately reciprocally proportional to the increase in acceleration voltage. The lower number of charge carriers introduced leads to lower electrostatic powder expulsion for the same exposure time.

Increasing the acceleration voltage causes a greater penetration depth of the electrons into the powdery material. In addition to the acceleration voltage, the maximum penetration depth of the electrons into the material is influenced by material parameters such as density, atomic mass and nuclear charge number. It is known that the maximum penetration depth in titanium at 60 kV is about 15 µm, at 90 kV about 30 µm and at 150 kV about 70 µm.

Due to the increased acceleration voltage, the energy introduced is distributed over a larger volume in the powder bed and, as a result, the tendency to form local temperature peaks and thus melting is reduced already during the preheating step. This leads to increased quality of the residual powder and effectively higher recycling grades of the material.

The maximum beam power of 100 kW takes into account the fact that in the interaction volume between electrons and the powdery material to be processed, the material can be converted to the molten state at typical beam parameters without undesirable effects caused by overheating, such as vaporization of the material. The calculation is based on the material-specific energy required for heating and melting and the interaction volume, which is a function of the acceleration voltage and the area exposed by the electron beam.

Method at Increased Acceleration Voltages with Preheating:

In the method according to the invention, the top loose layer 8 of powdery material is first applied to a substrate with the powder application device 9. Depending on the process stage, the base plate 10 or the powder bed 7 can be considered as the substrate, as well as the component 11 in later process stages.

In one embodiment of the method according to the invention, a preheating step is carried out. For this purpose, the uppermost loose layer 8 is exposed to the electron beam 4. The acceleration voltage of the electron beam 4 is at least 90 kV. In preferred embodiments of the method according to the invention, the acceleration voltage is between 90 and 150 kV, acceleration voltages of 100 kV and 120 kV are particularly preferred.

The blasting parameters are selected according to the quality of the powdery material. Typically, a beam current between at least 100 W and at most 100 kW is set. The scanning speed is at least 1 m/s and at most 1000 m/s.

In the preheating step, the loose layer 8 is bonded together by diffusion processes at the grain surfaces. This leads to a reduction in the contact resistance between the individual powder particles 12 in the layer 8, and consequently to a higher electrical conductivity at the surface of the powder bed. As a result, the charge introduced by the electron beam can be better dissipated and electrostatic powder expulsion can be avoided.

Subsequently, the melting step takes place. In this step, the electron beam gun 3 creates a solid bond by melting the powder particles 12 at points of the prepared powder bed 7 or its uppermost loose layer 8, which are specified by the 3D structure to be created.

The steps described above are repeated layer by layer until the 3D structure is finished.

Method at Increased Acceleration Voltages without Preheating:

Furthermore, the invention relates to a method for processing a powdery material without an additional preheating step.

In the method according to the invention, the powder application device 8 applies the top loose layer 8 of powdery material to a substrate. Depending on the process stage, the base plate 10 or the powder bed 7 can be considered as the substrate, as well as the component 11 in later process stages.

Subsequently, the electron beam gun 3 is used to create a solid bond by melting the powder particles 12 at locations of the prepared powder bed 12 or its uppermost loose layer 8, which are specified by the 3D structure to be created.

The acceleration voltage of the electron beam 4 is at least 90 kV. In preferred embodiments of the method according to the invention, the acceleration voltage is between 90 and 150 kV. Preferred examples are acceleration voltages of 100 kV and 120 kV.

The steps described above are repeated layer by layer until the 3D structure is finished.

In summary, the idea of the invention therefore manifests preferably in a method for additive manufacturing with an electron beam in which an acceleration voltage between 90 kV to 160 kV, in particular 100 kV or greater, preferably 120 kV or greater, again preferably greater than 120 kV, again preferably between 135 kV and 160 kV, is used during preheating and/or melting.

| Reference numbers | | |
|---|---|---|
| 1 Electron | beam | system |
| 2 Vacuum | | housing |
| 3 Electron | beam | gun |

| | Reference numbers | |
|---|---|---|
| 4 | Electron beam | |
| 5 | Magnetic optics unit | |
| 6 | Lifting table | |
| 7 | Powder bed | |
| 8 | Top loose layer | |
| 9 | Powder application device | |
| 10 | Base plate | |
| 11 | Component | |
| 12 | Powder particles, powdery material | |

What is claimed is:

1. A method for processing a powdery material comprising the following steps:
   a1) Providing an electron beam system comprising
   a device for receiving a powder bed of powdery material to be processed, and
   an electron beam generator configured to direct an electron beam to laterally different locations of the powder bed;
   b1) Applying a powder layer;
   c1) Preheating the powdery material of the powder layer with the electron beam;
   wherein
   the electron beam in step c1) is operated with an acceleration voltage of greater than 120 kV, and the electron beam system comprises an X-ray shield, which is configured in such a way that despite the acceleration voltage of greater than 120 kV, the X-ray radiation outside the electron beam system stays below a limit.

2. The method according to claim 1, further comprising the step of
   d1) melting at least part of the powder layer with the electron beam.

3. A method for processing a powdery material comprising the following steps:
   a2) providing an electron beam system comprising
   a device for receiving a powder bed of powdery material to be processed, and
   an electron beam generator configured to direct an electron beam to laterally different locations of the powder bed;
   b2) applying a powder layer;
   c2) melting of at least part of the powder layer with the electron beam;
   wherein
   the electron beam in step c) is operated with an acceleration voltage of greater than 120 kV, and the electron beam system comprises an X-ray shield, which is configured in such a way that despite the acceleration voltage of greater than 120 kV, the X-ray radiation outside the electron beam system stays below a limit and
   no preheating of the powder layer takes place between step b2) and step c2).

4. The method of claim 1, wherein the powdery material comprises titanium, copper, nickel, aluminium and/or alloys thereof.

5. The method of claim 1, wherein the powdery material has an average grain size D50 of from 10 μm to 150 μm.

6. The method according to claim 1, wherein the beam power of the electron beam is at least 100 W and at most 100 kW.

7. An electron beam system for processing a powdery material, comprising:
   a) a device for receiving a powder bed of the powdery material to be processed, and
   b) an electron beam generator adapted to direct an electron beam to laterally different locations of the powder bed,
   wherein
   c) the electron beam system is adapted to carry out the method according to claim 1.

8. The method of claim 1, wherein the limit is below the limit specified by a Radiation Protection Ordinance.

9. The method of claim 3, wherein the limit is below the limit specified by a Radiation Protection Ordinance.

10. The method of claim 3, wherein the powdery material comprises titanium, copper, nickel, aluminium and/or alloys thereof.

11. The method of claim 3, wherein the powdery material has an average grain size D50 of from 10 μm to 150 μm.

12. The method of claim 3, wherein the beam power of the electron beam is at least 100 W and at most 100 kW.

* * * * *